UNITED STATES PATENT OFFICE.

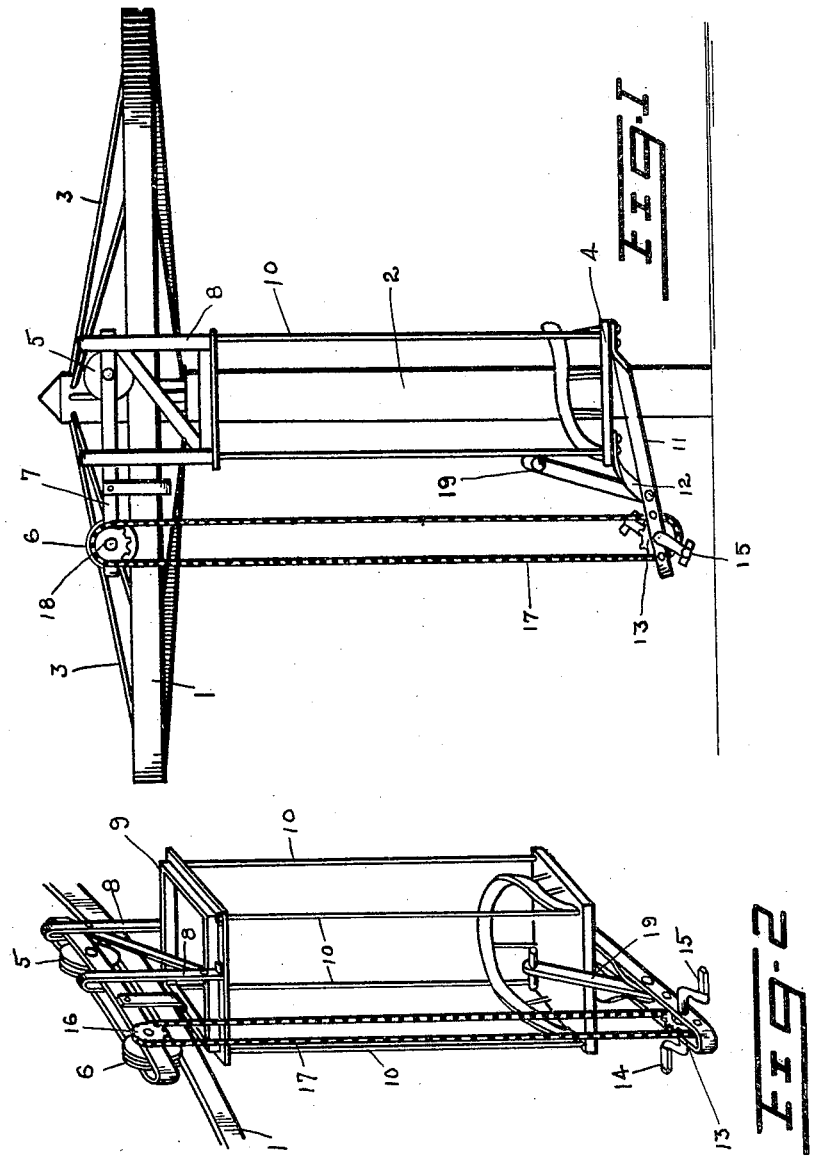

ROBERT D. WILSON, OF ROCHESTER, NEW YORK.

AUTO SWING.

1,402,127. Specification of Letters Patent. Patented Jan. 3, 1922.

Application filed June 2, 1921. Serial No. 474,563.

*To all whom it may concern:*

Be it known that I, ROBERT D. WILSON, a citizen of the United States, residing at Rochester, in the county of Monroe and State of New York, have invented certain new and useful Improvements in Auto Swings, of which the following is a specification.

The object of this invention is to provide a new and improved type of auto swing which is to be operated by the rider while riding thereon.

This and other objects of this invention, will be fully illustrated in the drawing, described in the specification, and pointed out in the claims at the end thereof.

In the drawing:

Figure 1 is a side elevation of the auto swing.

Figure 2 is a perspective view of the car and driving mechanism therefor.

In the figures of the drawing like reference numerals indicate like parts.

The auto swing forming the subject matter of this invention comprises a circular track 1 which is supported above ground by the central post 2, radial braces 3, 3 being provided at the top of the post 2 which project out therefrom at an angle thereto to connect the circular track 1 to the post, and rigidly support it thereon and concentric thereto.

The seat or car 4 of the auto swing is supported from the pulleys 5 and 6 which are adapted to roll on the circular track 1. The pulley 6 is mounted ahead of the pulley 5 and forms the leader therefor, and both of them are connected together by means of the frame 7. Depending from the frame 7 near the pulley 5 is a pair of brackets 8, 8. These brackets are adapted to support the rectangular frame 9 below the track 1. The frame 9 forms the top of the seat or car 4 which is supported therefrom by the tie rods 10, 10.

On the under side of the seat are provided the brackets 11 and 12 which project downwardly and forwardly and support at the outer end the sprocket wheel 13. This sprocket 13 is operated by a pair of pedals 14 and 15 projecting out from the sides thereof. On the operation of the sprocket by means of the pedals the rotation thereof is transmitted to the sprocket 16, through the sprocket chain 17.

The sprocket 16 is keyed to the shaft 18 on which the pulley 6 is carried and is mounted on the outside of the frame 7. On the rotation of the sprocket 16 the pulley 6 is rotated with it and propelled over the circular track 1. The seat 4 is thus operated to travel around the track 1 and the child riding in the car 4 furnishes the power necessary for the driving mechanism by pedaling the pedals 14 and 15.

A steering handle 19 is mounted ahead of the seat 4 and supported on the brackets 11 and 12. This handle is provided so that the rider of the auto swing will be able to hold on to the handle 19 and give his body the necessary support while pedaling the car.

As above described, the car and driving mechanism of the auto swing form a unit independent of the track over which it travels. This permits the car to swing sideways during its travel around the track without interfering in any way with the driving mechanism of the car.

The result secured by this construction, therefore, combines both the swinging features of the merry-go-rounds in which the cars are suspended by cables and rotated through the central post, as well as the features of the ordinary rotating merry-go-rounds in which the cars are mounted on a rigid platform and driven from the center thereof. The faster the car is propelled around the track the more the car swings out from the center of the post.

In practice it may be necessary to enclose the driving chain 17 in a casing to prevent the rider from coming in contact therewith.

Instead of driving the car of the auto swing by means of the sprocket and sprocket chain an electric motor may be attached to the driving pulley or its driving mechanism.

I claim:

1. An auto swing, comprising an endless track, pulleys adapted to roll over said track, one of them having a sprocket wheel thereon, a car supported by hanging from said pulleys, said car having a square frame with a seat therein supported at each corner from above, a sprocket wheel below said seat and forwardly thereof a support therefor attached to the bottom of the seat, pedals on said sprocket and a straight rim of endless chain extending between the sprockets.

2. An auto swing, comprising an endless track, pulleys adapted to roll over said track, one of them having a sprocket wheel thereon, a car supported by hanging from said pulleys, said car having a square frame with a seat therein supported at each corner from above, a sprocket wheel below said seat and forwardly thereof a support therefor attached to the bottom of the seat, pedals on said sprocket and a straight rim of endless chain extending between the sprockets, a handle extending upward from said support between the seat and the chain.

In testimony whereof I affix my signature.

ROBERT D. WILSON.